US011089202B2

(12) United States Patent
Chesnokov

(10) Patent No.: US 11,089,202 B2
(45) Date of Patent: Aug. 10, 2021

(54) FOCUS ADJUSTMENT FOR IMAGE CAPTURE DEVICE

(71) Applicant: Apical Limited, Cambridge (GB)

(72) Inventor: Viacheslav Chesnokov, Cambridge (GB)

(73) Assignee: Apical Limited, Cambridge (GB)

(*) Notice: Subject to any disclaimer, the term of this patent is extended or adjusted under 35 U.S.C. 154(b) by 0 days.

(21) Appl. No.: 16/576,163

(22) Filed: Sep. 19, 2019

(65) Prior Publication Data
US 2020/0014858 A1 Jan. 9, 2020

Related U.S. Application Data

(63) Continuation of application No. PCT/GB2018/050518, filed on Feb. 28, 2018.

(30) Foreign Application Priority Data

Mar. 30, 2017 (GB) ..................................... 1705103

(51) Int. Cl.
*H04N 5/232* (2006.01)
*H04N 5/235* (2006.01)
(Continued)

(52) U.S. Cl.
CPC ..... *H04N 5/232122* (2018.08); *H04N 5/2353* (2013.01); *H04N 5/2355* (2013.01);
(Continued)

(58) Field of Classification Search
CPC ......... H04N 5/23212; H04N 5/232122; H04N 5/2355; H04N 5/35554; H04N 5/35563;
(Continued)

(56) References Cited

U.S. PATENT DOCUMENTS

2014/0204241 A1 7/2014 Ohara
2014/0347532 A1* 11/2014 Kang ..................... H04N 5/351
348/294
(Continued)

FOREIGN PATENT DOCUMENTS

CN 105049755 A 11/2015

OTHER PUBLICATIONS

Combined Search and Examination Report dated Sep. 26, 2017 for GB Application No. GB1705103.8.
(Continued)

*Primary Examiner* — Paul M Berardesca
(74) *Attorney, Agent, or Firm* — EIP US LLP

(57) ABSTRACT

A control system for an image capture device. The control system includes an image sensor including sensor pixels including at least two sub-pixels respectively. First and second pluralities of the sensor sub-pixels capture first and second pixel data with a first and second exposure respectively. An image processor receives image data derived from a first set of the sensor sub-pixels including sub-pixels of the first and second pluralities of the sensor sub-pixels. On the basis of the image data, the image processor generates output data representing at least part of an output image. A focus controller receives focus data derived from a second set of the sensor sub-pixels including at least two of the first plurality of the sensor sub-pixels. On the basis of the focus data, the focus controller generates a control signal for adjusting a focus of the image capture device. Other examples relate to image sensors.

20 Claims, 7 Drawing Sheets

(51) Int. Cl.
*H04N 5/369* (2011.01)
*H04N 5/355* (2011.01)
*H04N 9/04* (2006.01)

(52) U.S. Cl.
CPC ..... *H04N 5/35563* (2013.01); *H04N 5/36961* (2018.08); *H04N 9/04557* (2018.08)

(58) Field of Classification Search
CPC ................ H04N 9/045; H04N 9/0451; H04N 9/0455–04551; H04N 9/04555–04561
See application file for complete search history.

(56) References Cited

U.S. PATENT DOCUMENTS

| | | | |
|---|---|---|---|
| 2015/0009352 A1* | 1/2015 | Shibagami | H04N 5/23212 348/218.1 |
| 2015/0296156 A1 | 10/2015 | Shin | |
| 2015/0312461 A1 | 10/2015 | Kim et al. | |
| 2015/0373250 A1* | 12/2015 | Sfaradi | H04N 5/232122 348/345 |
| 2016/0173750 A1* | 6/2016 | Kyung | H04N 9/04515 348/362 |
| 2016/0173751 A1* | 6/2016 | Nakata | H04N 5/35554 348/362 |
| 2016/0255289 A1 | 9/2016 | Johnson et al. | |
| 2016/0286108 A1 | 9/2016 | Fettig et al. | |
| 2017/0187949 A1* | 6/2017 | Kim | H04N 5/232122 |
| 2017/0353678 A1* | 12/2017 | Ogushi | H04N 5/232122 |
| 2017/0353679 A1* | 12/2017 | Negishi | H04N 5/378 |

OTHER PUBLICATIONS

International Search Report and Written Opinion dated Jun. 5, 2018 for PCT Application No. PCT/GB2018/050518.
Chinese Office Action dated Dec. 1, 2020 for Chinese Application No. 201880022623.5.

* cited by examiner

FOCUS ADJUSTMENT FOR IMAGE CAPTURE DEVICE

CROSS-REFERENCE TO RELATED APPLICATIONS

This application is a continuation of International Application No. PCT/GB2018/050518, filed Feb. 28, 2018, which claims priority to UK Application No. GB 1705103.8, filed Mar. 30, 2017, under 35 U.S.C. § 119(a). Each of the above-referenced patent applications is incorporated by reference in its entirety.

BACKGROUND OF THE INVENTION

Field of the Invention

The present invention relates to various image sensors and control systems for an image capture device.

Background

It is known to include image sensors in image capture devices such as mobile phone cameras or digital cameras to capture images. Known image sensors can be used to capture high dynamic range (HDR) images.

A known image sensor uses some sensor pixels to capture an image with a short exposure time and other sensor pixels to capture an image with a long exposure time. Images captured using a short exposure time typically include detail in bright parts of a scene or in light conditions, which may be saturated or over-exposed if captured using a long exposure time. In contrast, images captured using a long exposure time typically include detail in dark parts of the scene or in dark conditions that may be absent if captured using a short exposure time. The short and long exposure images are then combined to generate an HDR image.

To enhance the image quality of an image captured using an image sensor, the focus of the image capture device including or coupled to the image sensor can be adjusted appropriately, so that the image is in focus in the plane of the image sensor. It is known to control the focus of an image capture device using a process known as phase detection autofocus (PDAF). PDAF may be performed by comparing light intensity or luminance patterns obtained by photosensors at different positions. If the image capture device is in focus, the patterns match. A discrepancy between the patterns indicates that the image capture device is out of focus and that the focus of the image capture device should be adjusted accordingly.

It is desired to provide an image sensor and a control system for use with an image sensor that provides for improved control of the focus of an image capture device, in particular but not exclusively when higher quality HDR images are being captured.

SUMMARY

According to a first aspect of the present disclosure, there is provided a control system for an image capture device, the control system comprising: an image sensor comprising: an array of sensor pixels, sensor pixels of the array of sensor pixels comprising at least two sub-pixels respectively; and a colour filter array comprising a pattern of colour filter elements, colour filter elements corresponding to respective sensor pixels of the array of sensor pixels, wherein: a first plurality of the sensor sub-pixels are configured to capture first pixel data with a first exposure; and a second plurality of the sensor sub-pixels are configured to capture second pixel data with a second exposure different from the first exposure; an image processor configured to: receive image data derived from a first set of the sensor sub-pixels, the first set comprising: sub-pixels of the first plurality of the sensor sub-pixels; and sub-pixels of the second plurality of the sensor sub-pixels; and on the basis of the image data, generate output data representing at least part of an output image; and a focus controller configured to: receive focus data derived from a second set of the sensor sub-pixels, the second set comprising at least two of the first plurality of the sensor sub-pixels; and on the basis of the focus data, generate a control signal for adjusting a focus of the image capture device.

BRIEF DESCRIPTION OF THE DRAWINGS

Further features will become apparent from the following description, given by way of example only, which is made with reference to the accompanying drawings.

DETAILED DESCRIPTION OF CERTAIN INVENTIVE EMBODIMENTS

Figure 1:
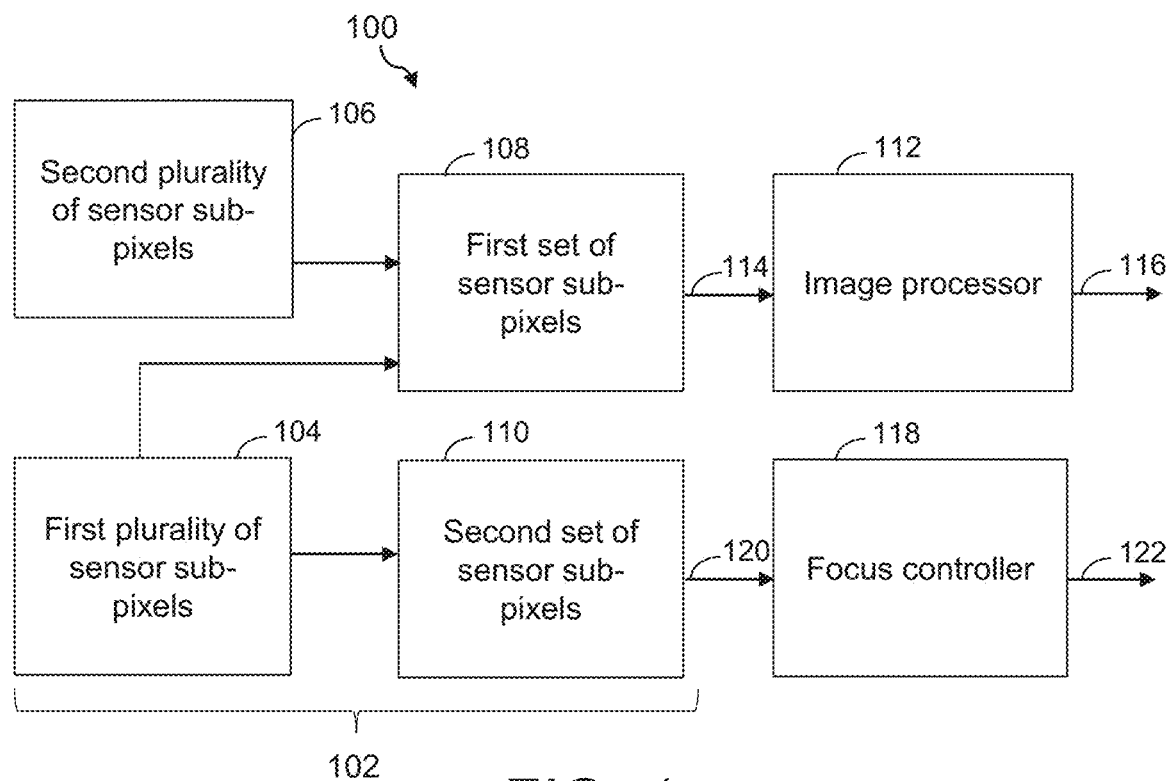
FIG. 1 is a schematic illustration of an example control system for an image capture device according to examples.

Details of examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

First examples described herein provide a control system for an image capture device. The control system includes an image sensor including an array of sensor pixels, an image processor and a focus controller. Using data derived from certain sub-pixels of the array of sensor pixels, the image processor can generate output data representing at least part of an output image. Using data derived from certain other sub-pixels of the array of sensor pixels, which may be the same or include at least some of the sub-pixels used by the image processor, the focus controller can generate a control signal for adjusting a focus of the image capture device.

The image sensor of the first examples, in conjunction with the control system, therefore allows both an image to be captured and a focus of the image capture device to be controlled, for example with improved control of the focus of the image capture device. This can improve the quality of the captured image, as will be explained in detail below.

Second examples relate to an image sensor with a first type of sensor pixel and a second, different, type of sensor pixel. The first type of sensor pixels can be used for a different purpose than the second type of sensor pixels. For example, the first type of sensor pixels can be used for the capture of an image for display or output to a user. In contrast, the second type of sensor pixels can be used to adjust the focus of an image capture device coupled to or including the image sensor. Thus, similarly to the first examples, the second examples can also be used to improve the control of the focus of the image capture device and consequently the quality of an image captured by the image sensor.

Third examples relate to a further control system for an image capture device. The further control system includes a focus controller configured to receive focus data based on pixel data from at least two sensor sub-pixels of different exposures from each other. An exposure typically depends on a combination of a shutter speed of an image capture device (and hence the time the image sensor is exposed to light, sometimes referred to as the exposure time) and characteristics of the image capture device, such as the size of the aperture (or iris) of the image capture device, which controls the amount of light incident on the image sensor, and/or the gain of the image capture device. Where the characteristics of the image capture device remain constant or unchanged, the exposure may therefore be proportional to the exposure time. Accordingly, references herein to a difference in exposure may also indicate a difference in exposure time. For example, the two sensor sub-pixels of different exposures from each other may have different exposure times to each other.

The focus controller can generate a control signal for adjusting the focus of the image capture device on the basis of the focus data. By using focus data based on sensor sub-pixels of different exposures, the quality of the focus data itself will be improved. For example, this allows detailed images to be captured for bright conditions, using the shorter exposure sensor sub-pixels, and dark conditions, using the longer exposure sensor sub-pixels and moderately bright conditions or a scene with varying bright and dark regions using a combination of the shorter and longer exposure sensor sub-pixels. From these detailed images, the extent by which the focus is to be adjusted can be accurately calculated, improving the quality of the images captured by an image sensor of the image capture device.

FIG. 1 shows schematically an example control system 100 for an image capture device (not shown). As described above, the image capture device may for example be a mobile phone or smartphone camera, a standalone digital camera, a digital camera coupled to or incorporated in a further electronic device, or a computer.

The control system 100 includes an image sensor 102. The image sensor 102 includes an array of sensor pixels. Sensor pixels of the array of sensor pixels include at least two sub-pixels respectively. Example arrays of sensor pixels are shown and described schematically with respect to FIGS. 2 to 6 and 8. The sensor pixels may be any suitable photosensors for capturing images. For example, a typical sensor pixel includes a photosensitive element such as a photodiode that can convert incident light into electronic signals or data. The sensor pixel may for example be a charge-coupled device (CCD) or a complementary metal-oxide-semiconductor (CMOS).

The image sensor in examples such as this includes a colour filter array that includes a pattern of colour filter elements. Colour filter elements correspond to respective sensor pixels of the array of sensor pixels. For example, the colour filter array may be considered to form a mosaic or repeating pattern. A colour filter element generally allows light of a particular colour to pass through to the corresponding sensor pixel. In this way, the colour filter array allows different sensor pixels of the array of sensor pixels to receive different colours of incident light, allowing a full-colour image to be captured. As typical photosensors are not sensitive to the wavelength of incoming light, typical sensor pixels would be unable to provide colour information from the detected light without a colour filter array. However, by separating incoming light into different wavelength ranges, corresponding to different colours, using the colour filter array, the intensity of light in these different wavelength ranges can be ascertained, allowing this colour information to be determined.

It is to be appreciated that a colour may refer to any range of wavelengths of light. For example, a clear, transparent or white colour filter element may nevertheless be considered to be a colour filter element in the sense that the colour filter element allows these particular wavelengths (such as all or substantially all) wavelengths in the visible spectrum to be transmitted to the underlying sensor pixel. In other examples, some or all of the colour filter elements may be non-white colour filter elements.

Sub-pixels of a sensor pixel may correspond to or be overlapped by the same colour filter element. For example, a continuous colour filter element may overlap or cover two sub-pixels of the same sensor pixel. However, in other examples, each or some sub-pixels of a sensor pixel may have a separate colour filter element. Typically, though, the sub-pixels of a sensor pixel have the same colour filter element as each other. In addition, the sub-pixels of a sensor pixel are generally adjacent to or neighbouring each other. Sub-pixels typically, though not always, have individual photosensors and may be controllable independently. For example, in FIG. 1, a first plurality 104 of the sensor sub-pixels are configured to capture first pixel data with a first exposure and a second plurality 106 of the sensor sub-pixels are configured to capture second pixel data with a second exposure different from the first exposure.

Thus, in examples such as FIG. 1, the first plurality 104 of the sensor sub-pixels may be operable independently of the second plurality 106 of the sensor sub-pixels. In such cases, the pattern of the first and second pluralities 104, 106 of the sensor sub-pixels may depend on the construction of the image sensor. For example, the first plurality 104 of the sensor sub-pixels may be connected to, and controllable via, a first control wire (not shown in FIG. 1) and the second plurality 106 of the sensor sub-pixels may be connected to, and controllable via, a second control wire, different from the first control wire. In other examples, individual sub-pixels or groups of sub-pixels of the first and/or second pluralities 104, 106 of the sensor sub-pixels may be connected to and controllable via separate control wires. This can provide increased control over the image sensor but may require additional processing power or memory and an increased complexity of the control circuitry.

The image sensor 102 of FIG. 1 has a first set 108 of sensor sub-pixels and a second set 110 of sensor sub-pixels. The first set 108 of sensor sub-pixels includes sub-pixels of the first plurality 104 of the sensor sub-pixels and sub-pixels of the second plurality 106 of the sensor sub-pixels. The second set 110 of sensor sub-pixels includes at least two of the first plurality 106 of the sensor sub-pixels. Thus, the first set 108 of sensor sub-pixels includes sub-pixels configured to capture pixel data with two different exposures, whereas the second set 110 of sensor sub-pixels includes sub-pixels configured to capture pixel data with the same exposure as each other.

The exposure of a sensor sub-pixel may be controlled or set electronically or in hardware. For example, the exposure may depend on the dimensions of a sensor sub-pixel, with larger sensor sub-pixels having longer exposures than smaller sensor sub-pixels. In other examples, for example with sensor sub-pixels of a uniform size, the exposure may be determined electronically, by controlling the opening and closing of a mechanical shutter in front of the sensor sub-pixel. Alternatively, the exposure may be controlled electronically using an electronic shutter, for example by calculating the signal received by the sensor sub-pixel for a controllable period of time.

The control system 100 also includes an image processor 112. The image processor 112 is configured to receive image data 114 derived from the first set 108 of sensor pixels and, on the basis of the image data 114, generate output data 116 representing at least part of an output image.

The output image may be a high dynamic range image. As the image data 114 is derived from the first set 108 of sensor pixels, which include sensor sub-pixels of the first and second pluralities 104, 106, which are arranged to capture pixel data with two different exposures, detail can be captured in both dark and bright conditions or image regions. For example, the image data 114 may include first sub-image data representing data received from the sub-pixels of the first plurality 104 of the sensor sub-pixels and second sub-image data representing data received from the sub-pixels of the second plurality 106 of the sensor sub-pixels. The luminance of light is for example representative of the amount of light or quantity or number of photons that pass through a certain area, such as the area of the at least one of: the sub-pixels of the first plurality 104 of the sensor sub-pixels or the sub-pixels of the second plurality 106 of the sensor sub-pixels.

In such cases, a relative contribution of the first sub-image data and the second sub-image data to the output data may depend on a luminance of light captured by at least one of: the sub-pixels of the first plurality 104 of the sensor sub-pixels or the sub-pixels of the second plurality 106 of the sensor sub-pixels. For example, the relative contribution of the first sub-image data and the second sub-image data to the output data for two sensor sub-pixels corresponding to a colour filter element of the same colour (which in this case is green), may be calculated using the following formula:

$$G_O = \alpha G_1 + (1 - \alpha)\frac{G_2}{R}$$

where $G_O$ is the output intensity of the sensor sub-pixel corresponding to a green colour filter element, $\alpha$ is a mask parameter, $G_1$ is the intensity of light captured by the sensor sub-pixel corresponding to the green colour filter element of the first plurality of sensor pixels (with a first exposure), $G_2$ is the intensity of light captured by the sensor sub-pixel corresponding to the green colour filter element of the second plurality of sensor pixels (with a second exposure) and R is the exposure ratio, which is equal to the second exposure time divided by the first exposure time. In cases where properties of the image capture device, such as the aperture size and/or the gain, are unaltered between capturing the first sub-image data and capturing the second sub-image data, the exposure ratio may also be expressed as the second exposure divided by the first exposure. The output intensity for sensor sub-pixels corresponding to other colour filter elements may be calculated similarly.

The mask parameter may be a function, for example a smoothly varying function of $G_1$ and/or $G_2$. This function may be calculated empirically or algorithmically. For example, the value of $\alpha$ may increase gradually in dependence on increasing light intensity captured by the sensor sub-pixel with the longer exposure.

In other examples, the mask parameter may take one of a plurality of values in dependence in other parameters such as $G_1$ and/or $G_2$. For example, if the first exposure is shorter than the second exposure, $\alpha$ may equal 1 if $G_2$ is greater than 90% of the maximum amount of light capturable by the sensor sub-pixel with the second exposure, and $\alpha$ may equal 0 otherwise. In this case, $G_O = G_1$ for bright conditions (in other words, the intensity of light captured by the sensor sub-pixel with the shorter exposure is used for the output intensity) and $G_O = G_2$ for dark conditions (in other words, the intensity of light captured by the sensor sub-pixel with the longer exposure is used for the output intensity).

Therefore, in summary, with the first exposure shorter than the second exposure and with the luminance of light captured by the sub-pixels of the second plurality of the sensor sub-pixels equal to or above a luminance threshold, the output data may be generated based on the first sub-image data, which is for example the data captured by the first plurality of sensor sub-pixels with the first exposure. Conversely, with the first exposure shorter than the second exposure and with the luminance of light captured by the sub-pixels of the second plurality of the sensor sub-pixels below the luminance threshold, the output data may be generated based on the second sub-image data, which is for example the data captured by the second plurality of sensor sub-pixels with the second exposure. The luminance threshold may for example depend on the intensity or luminance of light capturable by the sensor sub-pixel with the first or second exposure; in the example above, the luminance threshold is 90% of the maximum luminance capturable by a sensor sub-pixel of the second plurality. The luminance threshold may be determined experimentally or using theoretical calculations.

Thus, the image data derived from the first set of the sensor sub-pixels may not include both the first sub-image data and the second sub-image data. Rather, a determination may be made as to whether the image data is based on the first or second sub-image data or a combination of both the first and second sub-image data.

The control system 100 of FIG. 1 also includes a focus controller 118. The focus controller 118 is configured to receive focus data 120 derived from the second set 110 of the sensor sub-pixels and, on the basis of the focus data 120, generate a control signal 122 for adjusting a focus of the image capture device. As described above, the second set 110 of the sensor sub-pixels includes at least two of the first plurality 104 of the sensor sub-pixels, which are configured to capture first pixel data with a first exposure. In other words, the control signal 122 is generated on the basis of multiple sensor sub-pixels with the same exposure as each other.

The focus controller may be a phase-detection autofocus (PDAF) controller for adjusting the focus of the image capture device based on a phase detection autofocus process. For example, the focus data 120 may include data from two sensor sub-pixels of the first plurality 104 of the sensor sub-pixels which are separated along an axis, such as the horizontal axis. As described above, PDAF may be performed by comparing light intensity or luminance patterns obtained by photosensors at different positions, for example along an axis, such as the horizontal axis. If the image capture device is in focus, the patterns will be the same. If there is a difference between the patterns, this indicates that the image capture device is out of focus. Based on this determination, the focus of the image captured device can be adjusted accordingly, for example by altering the position of the lens with respect to the image sensor 102.

With a control system such as the control system 100 of FIG. 1, the image capture device can be used to capture HDR images (for example using the first set of the sensor sub-pixels) as well as focused appropriately (using the second set of the sensor sub-pixels). This can improve the quality of the image captured by the image capture device, allowing an in-focus HDR image to be obtained.

Sensor sub-pixels of the first and second sets may overlap. In other words, some sensor sub-pixels of the first plurality of the sensor sub-pixels may belong to both the first and second sets. With this arrangement, the overlapping sensor sub-pixels may be used both for HDR image capture and for the focusing procedure, obviating the need for dedicated pixels for calculating the focus of the image capture device. This means that HDR image capture and focusing can be carried out simultaneously or substantially simultaneously. This can be beneficial where the image capture device is used to capture video images, which may include a series of images, with each image corresponding to a frame of the video. For example, if the focus controller is configured to receive the focus data substantially simultaneously as the image processor is configured to receive the image data, the focusing process can be implemented while the image processor is continuing to generate the output data. For example, there may be no need to first adjust the focus and subsequently capture an image for display or output. Instead, the focus can be adjusted, for example by moving the lens, as the image capture device is continuing to capture image data using the image sensor. In such cases, the image data may include the focus data. For example, the image data may be obtained and a copy of all or part of the image data, such as the image data corresponding to at least two sensor sub-pixels of the first plurality, can be transmitted to the focus controller as the focus data.

As will be appreciated, in other examples, the image capture device may be used to capture still images. In such cases, the focus may be adjusted before an image is obtained or the focusing and image capture processes may occur substantially simultaneously, as for video capture.

Figure 2:
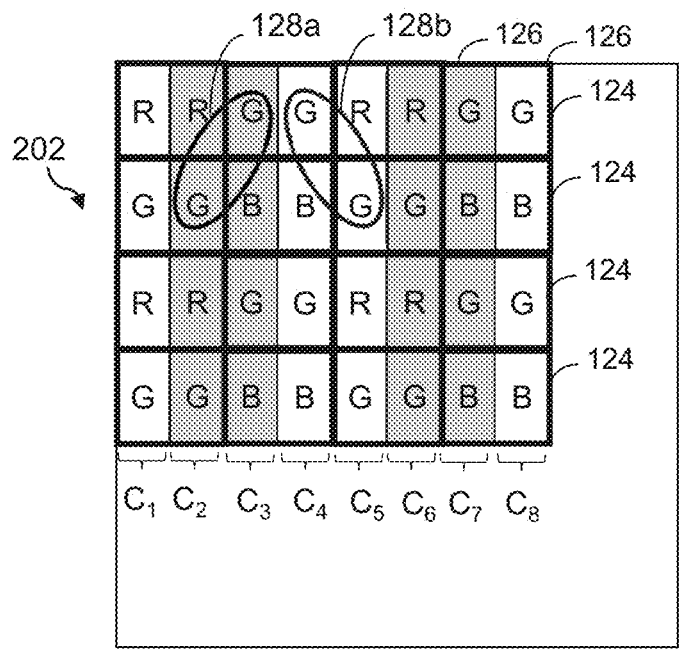
FIG. 2 is a schematic illustration of an image sensor according to examples.

Image sensors of various different structures and/or constructions may be used with the control system of FIG. 1 or other control systems such as those to be described below with reference to FIGS. 7, 9 and 10. FIG. 2 shows schematically an example of one such suitable structure for an image sensor. For clarity, some of the sensor pixels and sensor sub-pixels are omitted in the image sensor of FIG. 2.

The image sensor 202 of FIG. 2 includes a plurality of sensor pixels 124, some of which are labelled in the Figure. In the example of FIG. 2, each sensor pixel 124 corresponds with a respective colour filter element and includes two sensor sub-pixels 126, two of which are labelled in the Figure. Thus, in FIG. 2, each of the sensor sub-pixels 126 of a sensor pixel 124 correspond respectively with a colour filter element of the same colour as each other. The two sensor sub-pixels 126 labelled in FIG. 2 each respectively correspond with a green colour filter element (indicated with a "G" in the Figure). Sensor sub-pixels of other sensor pixels correspond with other colour filter elements, with red colour filter elements indicated with an "R" in the Figure and blue colour filter elements indicated with a "B" in the Figure. In examples such as FIG. 2, the pattern of colour filter elements may include at least one group of colour filter elements. For example, the pattern may be formed of repeating groups of colour filter elements. In this case, the at least one group of colour filter elements includes a red colour filter element, a blue colour filter element and two green colour filter elements, although other groups are possible in other examples. The colour filter array in FIG. 2 therefore corresponds to a Bayer pattern. Each group may correspond with the necessary sensor pixels to obtain a full-colour output image of a suitable quality.

Sensor sub-pixels of the first plurality of sensor sub-pixels are unshaded in the image sensor 202 of FIG. 2. In contrast, sensor sub-pixels of the second plurality of sensor-pixels are shaded in FIG. 2. Thus, as can be seen from the Figure, FIG. 2 is an example of an image sensor in which the first plurality of the sensor sub-pixels are in at least one first array column and the second plurality of the sensor sub-pixels are in at least one second array column, different from the at least one first array column. In FIG. 2, the first plurality of the sensor sub-pixels are in first, fourth, fifth and eighth array columns, $C_1$, $C_4$, $C_5$, $C_8$, and the second plurality of the sensor sub-pixels are in second, third, sixth and seventh array columns $C_2$, $C_3$, $C_6$, $C_7$. This is therefore an example in which the first plurality of the sensor sub-pixels are in two adjacent first array columns and the second plurality of the sensor sub-pixels are in two adjacent second array columns, one of the two adjacent first array columns adjacent to one of the two adjacent second array columns.

In the example of FIG. 2, all of the illustrated sensor sub-pixels belong to the first set of the sensor sub-pixels. Thus, FIG. 2 is an example of an arrangement in which the at least two of the first plurality of the sensor sub-pixels comprise two sensor sub-pixels of the same sensor pixel. This can further improve the accuracy of the HDR image capture, for example due to the smaller distance between long and short exposure sub-pixels corresponding to the same colour filter element.

A subset of the sensor sub-pixels belong to the second set of the sensor sub-pixels in the example of FIG. 2. Hence, the first set of the sensor sub-pixels in this example includes the at least two of the first plurality of the sensor sub-pixels of the second set of the sensor sub-pixels. The sensor sub-pixels of the second set are ringed in FIG. 2 and include a first pair of sensor sub-pixels 128a and a second pair of sensor sub-pixels 128b. The first pair of sensor sub-pixels 128a are of the second plurality of the sensor pixels (with a second exposure) and the second pair of sensor sub-pixels are of the first plurality of the sensor pixels (with a first exposure). Each of the sub-pixels of the first pair 128a and the second pair 128b are associated respectively with a colour filter element of the same colour as each other, which in this example is a green colour filter to maximize brightness for the generation of the focus data, although other colours are possible in other examples. The first and second pairs 128a, 128b of sensor sub-pixels of the second set are used to generate the focus data. For example, intensity data obtained from the left sub-pixel of the first pair 128a can be compared with intensity data obtained from the right sub-pixel of the first pair 128a as part of a PDAF process, to determine whether the imaging system of the image capture device is in focus and thus generate focus data. Intensity data obtained using the left and right sub-pixels of the second pair 128b can also be compared similarly to further ascertain the focus of the image capture device. The generation of the focus data will be described in detail below with reference to FIG. 7.

As can be seen from FIG. 2, in this example, the second set of the sensor sub-pixels, which include the first and second pairs 128a, 128b of sensor sub-pixels, include a first sensor sub-pixel adjacent to a second sub-pixel in a horizontal direction. For example, the left and right sensor sub-pixels of the first pair 128a and second pair 128b are each, horizontally, the closest two sensor sub-pixels that correspond to the same colour of colour filter element as each other and of the same exposure to each other. By including adjacent sensor sub-pixels in the second set, for the generation of the focus data, the accuracy of the focusing procedure can be improved compared with other cases in which there is a larger distance between sensor sub-pixels of the second set. In this example, despite the left and right sensor sub-pixels of the first pair 128a corresponding to different sensor pixels from each other, the sensor sub-pixels of the first pair 128a (and hence of the second set) nevertheless correspond respectively to a colour filter element of the same colour as each other, which in this example is a green colour filter element (although other colours are possible in other examples).

In examples such as FIG. 2, the second set of the sensor sub-pixels includes a first sensor sub-pixel in a first array row and a first array column and a second sensor sub-pixel in a second array row and a second array column, with the first array row adjacent to the second array row and the first array column adjacent to the second array column. The sensor sub-pixels of the first pair 128a are in such a position relative to each other, for example with a diagonal offset with respect to each other.

Figure 3:
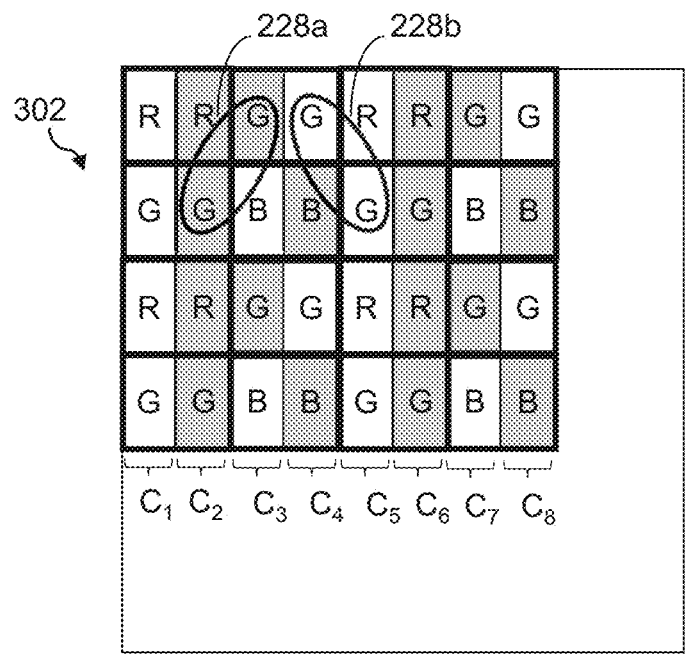
FIG. 3 is a schematic illustration of an image sensor according to further examples.

Another image sensor 302 with a different pattern but with similarly offset sub-pixels of a first pair 228a of the second set of the sensor sub-pixels is illustrated in FIG. 3. A second pair 228b of the second set of the sensor sub-pixels is illustrated in FIG. 3. Thus, in FIG. 3, the second set of the sensor sub-pixels includes the first and second pairs 228a, 228b. As in FIG. 2, the first set of the sensor sub-pixels includes all the illustrated sensor sub-pixels and hence the second set of the sensor sub-pixels is a subset of the first set. Features of FIG. 3 similar to corresponding features of FIG. 2 are illustrated similarly, but some reference numerals are omitted for clarity.

The image sensor 302 of FIG. 3 is similar to that of FIG. 2 but with a different pattern of sensor sub-pixels belonging to the first plurality and the second plurality. As in FIG. 2, the first plurality of the sensor sub-pixels are unshaded and the second plurality of the sensor sub-pixels are shaded in FIG. 3.

In examples such as FIG. 3, the array of sensor pixels includes a first array column in which a sensor sub-pixel of the first plurality of the sensor sub-pixels alternates with a sensor sub-pixel of the second plurality of the sensor sub-pixels. The array of sensor pixels in such examples may also include a second array column in which a sensor sub-pixel of the first plurality of the sensor sub-pixels alternates with a sensor sub-pixel of the second plurality of the sensor sub-pixels, the second array column adjacent to the first array column and with the sensor sub-pixels of the first plurality of the sensor pixels of the first array column adjacent to the sensor sub-pixels of the second plurality of the sensor pixels of the second array column and with the sensor sub-pixels of the second plurality of the sensor pixels of the first array column adjacent to the sensor sub-pixels of the first plurality of the sensor pixels of the second array column. The third and fourth array columns, $C_3$, $C_4$, of FIG. 3 are an example of a first and second array column respectively. The array of sensor pixels in these examples may additionally include a third array column adjacent to the second array column, the third array column including sensor sub-pixels of the first plurality of the sensor sub-pixels, and a fourth array column adjacent to the third array column, the fourth array column including sensor sub-pixels of the second plurality of the sensor sub-pixels. The fifth and sixth array columns, $C_5$, $C_6$, of FIG. 3 are an example of a third and fourth array column respectively.

Figure 4:
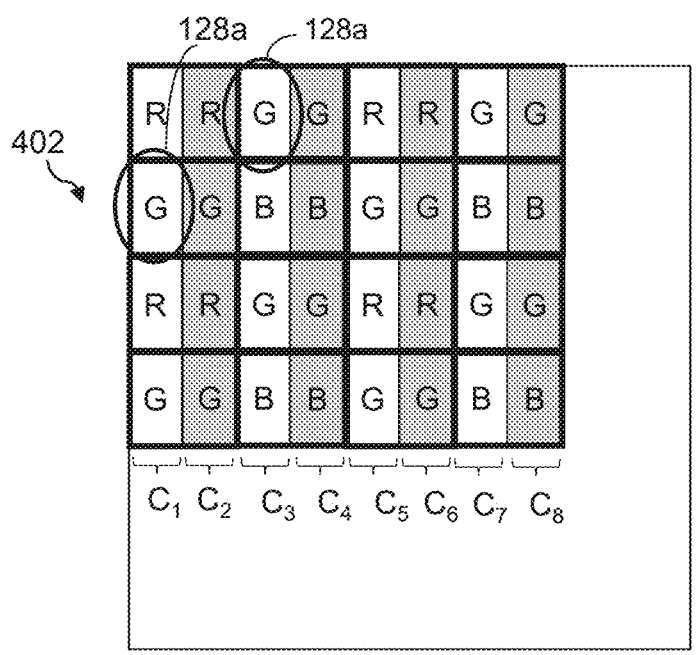
FIG. 4 is a schematic illustration of an image sensor according to yet further examples.

FIG. 4 shows a further example of an image sensor 402 with a different pattern of sensor sub-pixels belonging to the first plurality and the second plurality. Features of FIG. 4 similar to corresponding features of FIG. 2 are illustrated similarly, but some reference numerals are omitted for clarity. As in FIGS. 2 and 3, the first plurality of the sensor sub-pixels are unshaded and the second plurality of the sensor sub-pixels are shaded in FIG. 4.

In FIG. 4, the sensor sub-pixels of the first plurality are in array columns which alternate with array columns of the sensor sub-pixels of the second plurality. The first set of the sensor sub-pixels includes all the sensor sub-pixels illustrated. The second set of the sensor sub-pixels includes the first pair 128a of sensor sub-pixels (each one of which is ringed). With this structure, the sensor sub-pixels of the first pair 128a (which are part of the second set) are no longer adjacent to each other. In this example, the sensor sub-pixels of the first pair 128a are the closest sensor sub-pixels corresponding to the same colour filter element and with the same exposure to each other.

Figure 5:
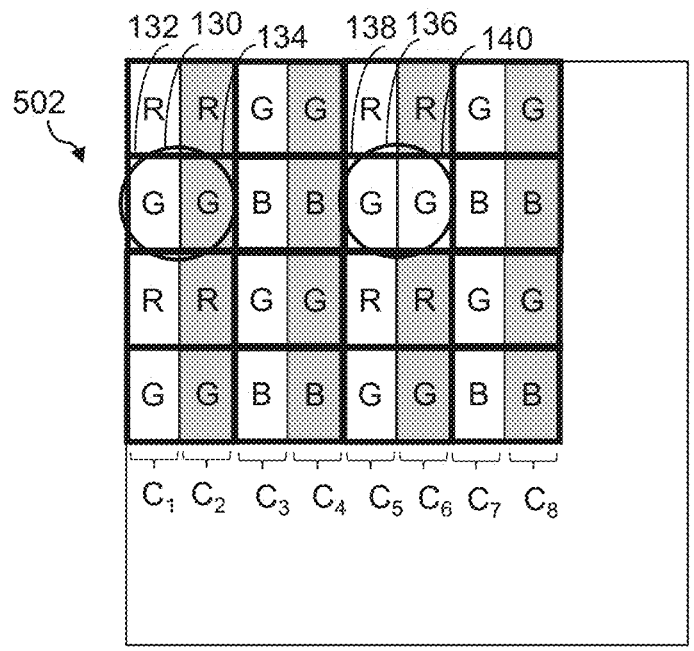
FIG. 5 is a schematic illustration of an image sensor according to still further examples.

FIG. 5 shows a yet further example of an image sensor 502 with a different pattern of sensor sub-pixels. Features of FIG. 5 similar to corresponding features of FIG. 2 are illustrated similarly, but some reference numerals are omitted for clarity. As in FIGS. 2 to 4, the first plurality of the sensor sub-pixels are unshaded and the second plurality of the sensor sub-pixels are shaded in FIG. 5.

Image sensors such as that of FIG. 5 include an array of sensor pixels, sensor pixels of the array of sensor pixels including at least two sub-pixels. A first type 130 of sensor pixel of the array of sensor pixels includes a first sensor sub-pixel 132 configured to capture first pixel data with a first exposure and a second sensor sub-pixel 134 configured to capture second pixel data with a second exposure different from the first exposure. A second type 136 of sensor pixel of the array of sensor pixels, different from the first type of sensor pixel, includes a third sensor sub-pixel 138 configured to capture third pixel data with a third exposure and a fourth sensor sub-pixel 140 configured to capture fourth pixel data with the third exposure.

The first type 130 of sensor pixel may be used for image capture, for example for HDR image capture as described above. The first exposure may be shorter than the second exposure, for example so that the first sensor sub-pixel 132 can be used to capture images in bright conditions and so that the second sensor sub-pixel 134 can be used to capture images in dark conditions. This can allow an image with a larger dynamic range to be obtained.

The second type 136 of sensor pixel may be used for focusing, for example using a PDAF process as explained above. The third exposure of the third and fourth sensor sub-pixels 138, 140 may be different from or the same as one or both of the first exposure and the second exposure. For example, the third exposure may be equal to the first exposure or the third exposure may be longer than the first exposure and shorter than the second exposure, for example if the first exposure is relatively short and the second exposure is relatively. In the example of FIG. 3, the third exposure is equal to the first exposure, and thus the first, third and fourth sub-pixels 132, 138, 140 are all of the first plurality of the sensor sub-pixels. The second sub-pixel 134 is of the second plurality of the sensor sub-pixels in FIG. 5.

In the example of FIG. 5, similarly to FIGS. 2 to 4, the image sensor 502 includes a colour filter array including a pattern of colour filter elements, colour filter elements corresponding to respective sensor pixels of the plurality of sensor pixels. The pattern of colour filter elements includes at least one group, in FIG. 5 a plurality of groups, of colour filter elements. The groups of colour filters in FIG. 5 each include a red colour filter element, a blue colour filter element and two green colour filter elements. In examples such as FIG. 5, a green colour filter element corresponds to a sensor pixel of the second type 136 to increase the luminance of light captured for the PDAF process. In other examples, though, a colour filter element of a different type may correspond to a sensor pixel of the second type. Furthermore, each sensor sub-pixel may include a respective colour filter element rather than there being one colour filter element per sensor pixel.

Figure 6:
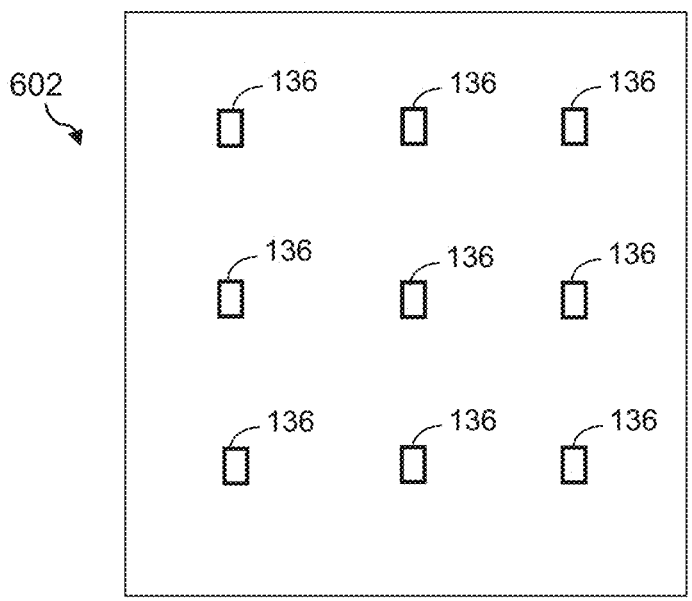
FIG. 6 is a schematic illustration of an image sensor according to further examples.

The sensor pixels of the second type 136 are typically a subset of the sensor pixels of the image sensor. The sensor pixels of the second type 136 may be distributed throughout the image sensor in any suitable pattern or arrangement. FIG. 6 illustrates schematically an example arrangement of sensor pixels of the second type 136 in an image sensor 602. In examples such as FIG. 6, at least 85%, 90% or 95% of the array of sensors pixels are of the first type 130 (not shown in FIG. 6, for clarity). In such cases, the quantity of sensor pixels of the second type 136 may nevertheless be sufficient for accurately calculating and adjusting the focus of the image capture device. Sensor pixels of the second type 136 may be substantially uniformly distributed in the array of sensor pixels, for example with a variation in distance between neighbouring sensor pixels of the second type 136 of less than 10%. FIG. 6 shows such an example.

Figure 7:
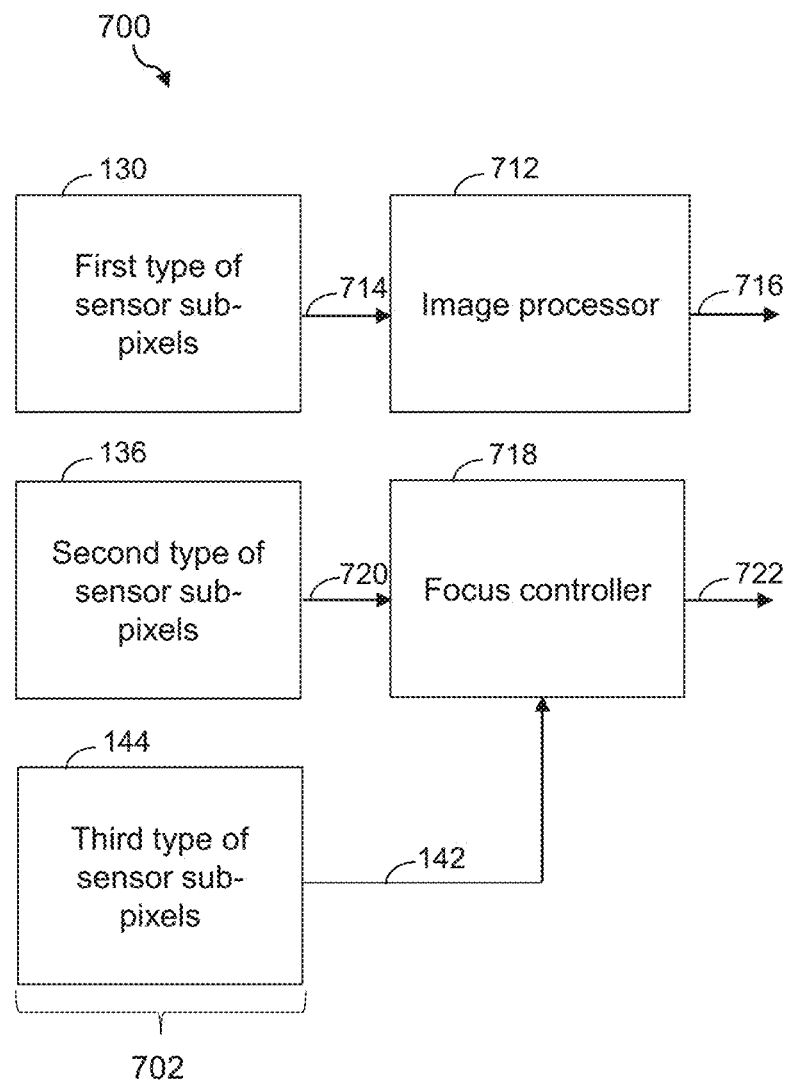
FIG. 7 is a schematic illustration of a further example control system for an image capture device according to further examples.

FIG. 7 is a schematic illustration of a further example control system for an image capture device according to further examples. Features of FIG. 7 similar to corresponding features of FIG. 1 are labelled with the same reference numerals but incremented by 100; corresponding descriptions are to be taken to apply.

The example control system 700 of FIG. 7 includes a focus controller 718 and an image sensor 702. The image sensor 702 is for example the same as or similar to the image sensors 502, 602 described with reference to FIGS. 5 and 6.

In some examples, the focus controller 718 is configured to receive focus data 720 derived from sensor pixels of the second type 136 and on the basis of the focus data 720, generate a control signal for adjusting a focus of the image capture device. For example, the focus controller 718 may be similar to the focus controller 118 and may be a PDAF controller for adjusting the focus of the image capture device based on a PDAF process.

However, in other examples, such as that of FIG. 7, the focus controller 718 is configured to receive further focus data 142 derived from sensor pixels of a third type 144 and generate the control signal on the basis of at least one of the focus data 720 or the further focus data 142.

Figure 8:
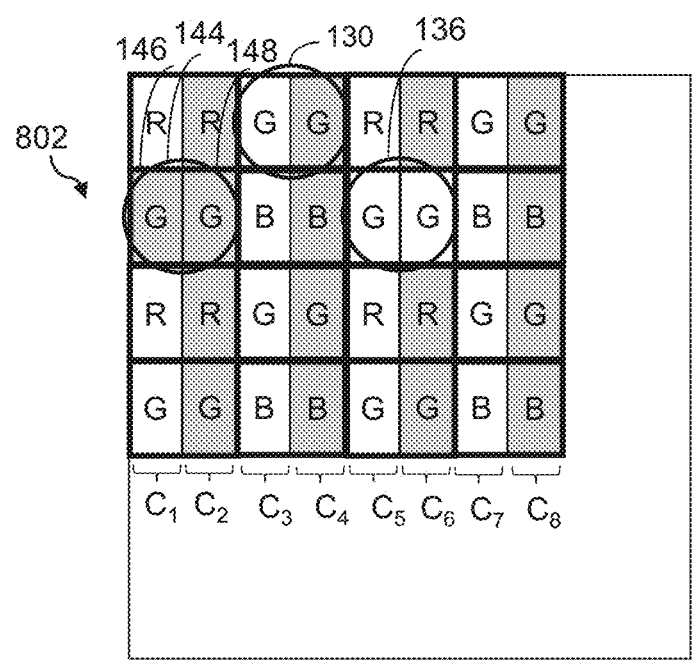
FIG. 8 is a schematic illustration of an image sensor according to examples.

An example image sensor with sensor pixels of the third type is illustrated schematically in FIG. 8. The image sensor 802 of FIG. 8 is similar to the image sensor 602 of FIG. 6, but includes sensor pixels of the first type 130, sensor pixels of the second type 136 and sensor pixels of the third type 144. The sensor pixels of the first and second types 130, 136 of FIG. 8 are the same as the sensor pixels of the first and second types 130, 136 of FIG. 6 and are thus labelled with the same reference numeral.

In examples such as FIG. 8, the third type of sensor pixel of the array of sensor pixels includes a fifth sensor sub-pixel 146 configured to capture fifth pixel data with a fourth exposure and a sixth sensor sub-pixel 148 configured to capture fifth pixel data with the fourth exposure. The fourth exposure is different from the third exposure of the third and fourth sensor sub-pixels 138, 140 of the second type 136 of sensor pixel. In the example of FIG. 8, the fourth exposure is equal to the second exposure (of the second sub-pixel 134 of the first type 130 of sensor pixel). However, in other examples, the fourth exposure may be different from the first and/or second exposures.

Similarly to the image sensor 602 of FIG. 6, the image sensor 802 of FIG. 8 includes a colour filter array including a pattern of colour filter elements, colour filter elements corresponding to respective sensor pixels of the plurality of sensor pixels. In FIG. 8, a green colour filter element corresponds to a sensor pixel of the third type 144. In other examples, though, sensor pixels of the third type may correspond with a colour filter element of a different colour or different sensor pixels of the third type may correspond with colour filter elements of different colours.

Referring back to FIG. 7, the generation of the control signal by the focus controller 718 may be based on focus characteristic data indicative of a focus characteristic of the image capture device. For example, the focus characteristic may be indicative of whether the image capture device is in focus. The control signal may then be the signal transferred to the image capture device to alter or adjust components of the image capture device such as the lens to compensate for the calculated focus of the image capture device based on the focus characteristic data.

The generation of the focus characteristic data may involve the comparison of light intensity patterns for light captured by each one of a pair of sensor sub-pixels for the sensor pixels of the second type, and similarly for the sensor pixels of the third type (if the image sensor includes sensor pixels of the third type). This comparison for example involves the determination of a separation error for intensity patterns captured by each pair of sensor sub-pixels, which generally represents the difference between the intensity patterns captured by each of the sensor sub-pixels, which are typically in a different horizontal location. The separation error will differ depending on the focus of the image capture device. If the image capture device is in focus, the separation error will be zero, and the intensity patterns of each of the pair of sensor sub-pixels will be the same. Conversely, if the position of the lens is such that images are brought into focus in front of the sensor sub-pixels, there will be a different (non-zero) separation error than if the position of the lens is such that image are brought into focus behind the sensor sub-pixels. Thus, from the separation error, the control signal can be generated to move the lens appropriately for the lens to bring images into focus at the position of the sensor sub-pixels. Accordingly, the focus characteristic data may represent or be indicative of the separation error.

A relative contribution of the focus data 720 and the further focus data 142 to the focus characteristic data may depend on a luminance of light captured by at least one of: the sensor pixels of the second type or the sensor pixels of the third type. Similarly to the generation of the image data 114 described with reference to FIG. 1, by selectively calculating the focus characteristic data using the focus data 720 or the further focus data 142, which is captured with two different exposures from the second and third type of sensor pixels, the focus characteristic data and hence the control signal can be accurately calculated in both dark and bright image regions.

In examples in which the third exposure is shorter than the fourth exposure, the focus characteristic data 722 may be generated based on the focus data 720 with the luminance of light captured by the sensor pixels of the third type equal to or above a luminance threshold. In such examples, the focus characteristic data 722 may be generated based on the further focus data 142 with the luminance of light captured by the sensor pixels of the third type below the luminance threshold. For example, the luminance threshold may correspond to a transition at which the sensor pixels of the second type (with a shorter exposure than the sensor pixels of the third type) begin to be saturated. In other words, below the luminance threshold, detail may be captured by the sensor pixels of the second type. Above the luminance threshold, the sensor pixels of the second type may be saturated but detail can be captured by the sensor pixels of the third type, which have a longer exposure. Thus, the luminance threshold may for example depend on the intensity or luminance of light capturable by the sensor pixels with the third or fourth exposure, which are of the second and third types respectively. For example, the luminance threshold may be determined experimentally and may for example by 90% of the maximum luminance capturable by the sensor pixels of the third type.

The control system 700 of FIG. 7 also includes an image processor 712, which receives image data 716 derived from the first type 130 of sensor sub-pixels. The image processor 712 may be similar to the image processor 112 of FIG. 1 and in this example is configured to generate output data 716 representing at least part of an output image, on the basis of the image data 716. The generation of the output data 716 may be similar to the generation of the output data 116 described above with reference to FIG. 1. In other examples, the control system may not include an image processor. For example, the image processor may be part of a separate control system or may be omitted.

Although the generation of the further focus data 142 is described here with reference to the control system 700 of FIG. 7, it will be appreciated that further focus data may be calculated similarly for different control systems, for example control systems that include a different image sensor than the image sensor 702 of FIG. 7. For example, further focus data may be generated with the further example control system 900 of FIG. 9, which may be used with an image sensor such as the image sensors 202, 302, 402, 502, 602 of FIGS. 2 to 6. Features of FIG. 9 similar to correspond features of FIG. 1 are labelled with the same reference numeral but incremented by 100; corresponding descriptions are to be taken to apply.

Figure 9:
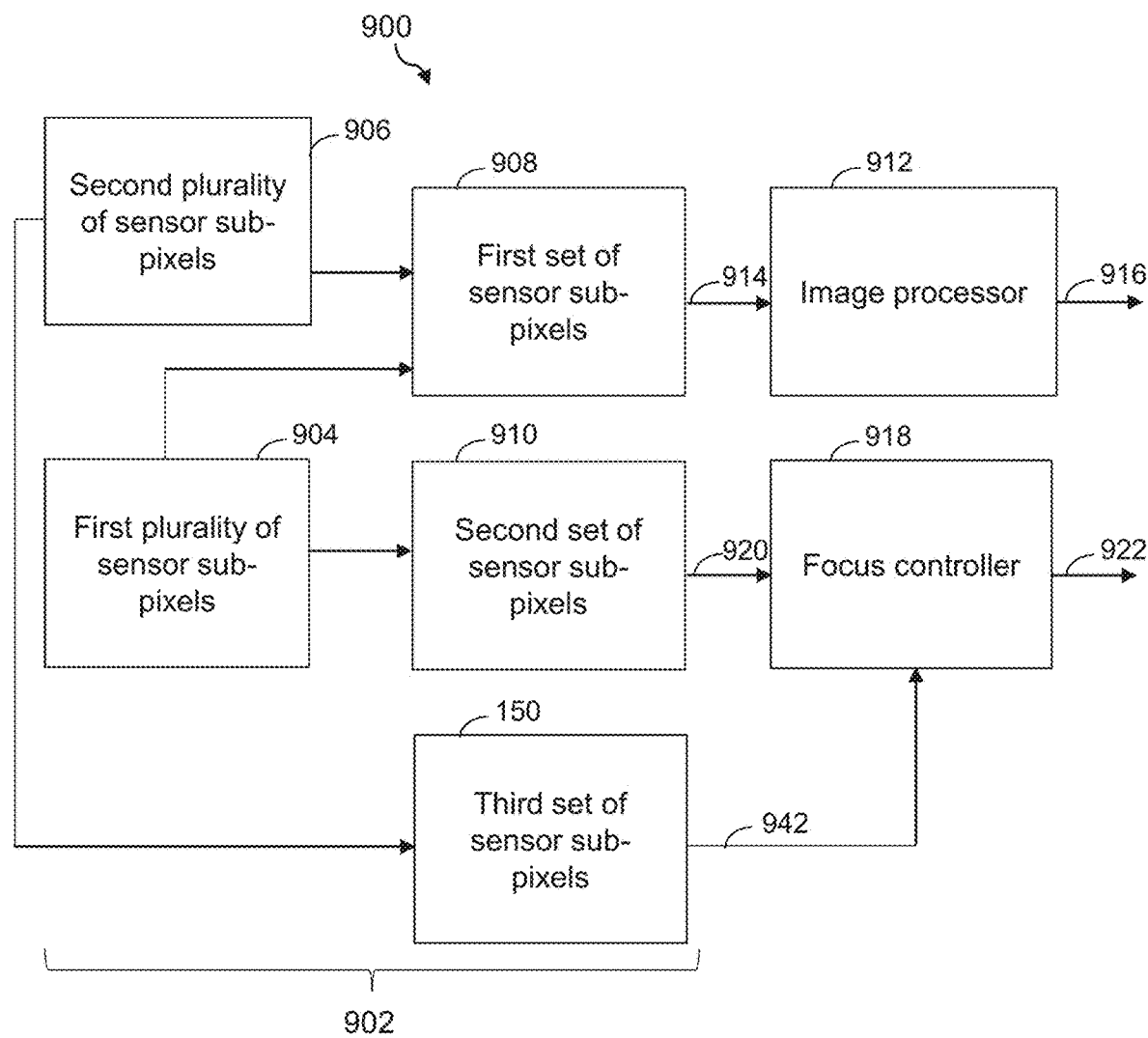
FIG. 9 is schematic illustration of a yet further example control system for an image capture device according to further examples.

In FIG. 9, in addition to a first set of the sensor sub-pixels 908 and a second set of the sensor sub-pixels 910, the image sensor 902 also includes a third set of the sensor sub-pixels 150. The third set of the sensor sub-pixels have a third exposure different from the first exposure of the first plurality of the sensor sub-pixels. In examples such as that of FIG. 9, the third exposure is equal to the second exposure as the third set of the sensor sub-pixels 150 includes at least two of the second plurality of the sensor sub-pixels 906. For example, the at least two of the second plurality of the sensor sub-pixels 906 may include pairs of horizontally adjacent sensor sub-pixels of the second plurality 906, to improve the accuracy of the focus control procedure. In other examples, though, the image sensor may include a third plurality of the sensor sub-pixels with the third exposure, with the third exposure different from both the first exposure and the second exposure.

The control system 900 of FIG. 9 receives further focus data 942 from the third set of the sensor sub-pixels 150 and generates the control signal on the basis of the at least one of the focus data 920 (derived from the second set of the sensor sub-pixels 910) or the further focus data 942. The further focus data 942 may be similar to the further focus data 142 described with reference to FIG. 7 and may be utilized in a similar way to generate the control signal. For example, the focus controller 918 may be configured to generate the control signal based on characteristic data indicative of a focus characteristic, a relative contribution of the focus data 920 and the further focus data 942 to the focus characteristic data depending on a luminance of light captured by at least one of the second set of the sensor sub-pixels 910 or the third set of the sensor sub-pixels 150. In cases in which the first exposure is shorter than the third exposure, the focus characteristic data may be generated based on the focus data 920 with the luminance of light captured by the third set of the sensor sub-pixels 910 equal to or above a luminance threshold. In such cases, the focus characteristic may be generated based on the further focus data 942 with the luminance of light captured by the third set of the sensor sub-pixels 910 below the luminance threshold.

Figure 10:
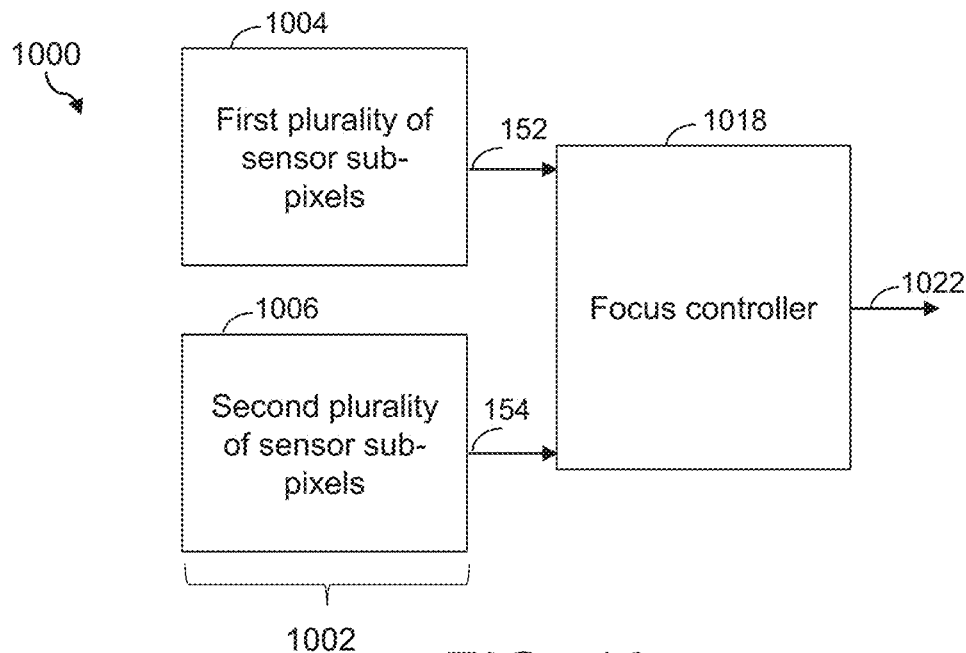
FIG. 10 is schematic illustration of a still further example control system for an image capture device according to yet further examples.

FIG. 10 shows a yet further example of a control system 1000 for an image capture device. The control system 1000 of FIG. 10 includes an image sensor 1002. The image sensor 1002 includes an array of sensor pixels, sensor pixels of the array of sensor pixels including at least two sensor sub-pixels respectively. A first plurality of the sensor sub-pixels 1004 are configured to capture first pixel data with a first exposure and a second plurality of the sensor sub-pixels 1006 are configured to capture second pixel data with a second exposure different from the first exposure. The structure of the image sensor 1002 is described further below.

The control system 1000 of FIG. 10 also includes a focus controller 1018. The focus controller 1018 receives focus data (not shown in FIG. 10) based on: the first pixel data 152 of at least two of the first plurality of the sensor sub-pixels 1004 and the second pixel data 154 of at least two of the second plurality of the sensor sub-pixels 1006. The focus controller 1018 is further configured to generate a control signal 1022 for adjusting a focus of the image capture device. The control signal 1022 may be similar to that described with reference to FIGS. 1 and 9.

By using both the first and second pluralities of the sensor sub-pixels 1004, 1006, with different exposures from each other, the focus data can be accurately generated in both light and dark conditions. A relative contribution of the first pixel data and the second pixel data to the focus data may depend on a luminance of light captured by at least one of the at least two of the first plurality of the sensor sub-pixels 1004 or at least one of the at least two of the second plurality of the sensor sub-pixels 1006. For example, in cases in which the first exposure is shorter than the second exposure, a first relative contribution of the first pixel data 152 to the focus data for a first luminance of light captured by the at least one of the at least two of the first plurality of the sensor sub-pixels 1004 may be smaller than a second relative contribution of the first pixel data 152 to the focus data for a second luminance of light captured by the at least one of the at least two of the first plurality of the sensor sub-pixels 1004, the second luminance larger than the first luminance.

In other examples, the focus controller 1018 is configured to derive the focus data based on the first pixel data 152 and the second pixel data 154. The deriving the focus data may include selecting one of the first pixel data 152 and the second pixel data 154 to obtain selected pixel data and generating the focus data based on the selected pixel data. The one of the first pixel data 152 and the second pixel data 152 may be selected in dependence on a luminance of light captured by at least one of the at least two of the first plurality of the sensor sub-pixels 1004 or at least one of the at least two of the second plurality of the sensor subpixels 1006. For example, the first pixel data 152 may be selected for the luminance of light captured by the at least one of the at least two of the second plurality of the sensor subpixels 1006 equal to or above a luminance threshold and selecting the second pixel data 154 for the luminance of light captured by the at least one of the at least two of the second plurality of the sensor sub-pixels 1006 below the luminance threshold. This may be the case where the second exposure is longer than the first exposure. The luminance threshold may be as described previously and may correspond to approximately 90% or 90% of a maximum luminance capturable by one of the second plurality of the sensor sub-pixels 1006.

In other examples, one of the first pixel data 152 and the second pixel data 154 may be selected, or the relative contribution of the first pixel data 152 and the second pixel data 154 to the focus data may be determined, based on motion in the scene to be captured by the image sensor 1002 such as motion of an object in the scene on which the focus determination by the focus controller 1018 is to be made. For example, with the first exposure of the at least two of the first plurality of the sensor sub-pixels 1004 shorter than the second exposure of the at least two of the second plurality of the sensor sub-pixels 1006, the first pixel data 152 may be selected for scenes with a relatively large amount of motion, or with motion equal to or above a threshold amount of motion. Conversely, the second pixel data 154 may be selected for scenes with less motion or with motion below a threshold amount of motion. In this way, the focus data may be selected appropriately, for example using first pixel data 152 obtained with a shorter exposure time for focusing on rapidly moving objects or scenes. Similarly, second pixel data 154 obtained with a longer exposure time, and therefore suffering from less noise than the first pixel data 152 captured with a shorter exposure time, can be used for focusing on stationary or less mobile objects or scenes.

The amount of motion in an image may be calculated using any suitable method, as the skilled person will appreciate. For example, the amount of motion may be determined by comparing the first pixel data 152 (with the shorter exposure time) with the second pixel data 154 (with the longer exposure time). In examples, a comparison of the amount of motion with the threshold amount of motion may be performed in accordance with the following equation:

$$|F_1 R - F_2| < \Delta$$

where $F_1$ is the first pixel data 152 (with a first exposure shorter than a second exposure for the second pixel data 154), R is the exposure ratio as defined above, which is equal to the second exposure time divided by the first exposure time, $F_2$ is the second pixel data 154 and $\Delta$ is a noise threshold value, which is for example the expected noise for sensor sub-pixels of the first plurality of the sensor sub-pixels 1004, with the shorter exposure. In these examples, if a difference between pixel values of at least one of the first plurality of the sensor sub-pixels 1004 (represented by the first pixel data 152) compensated by the exposure ratio and pixel values of at least one of the second plurality of the sensor sub-pixels 1006 (represented by the second pixel data 154) is below the expected noise for sensor sub-pixels of the first plurality of the sensor sub-pixels 1004, the image may considered to be relatively static or non-moving. In such cases, the second pixel data 154 may be selected. Conversely, the first pixel data 152 may be selected if the calculated amount of motion is equal to or larger than the noise threshold value $\Delta$.

In further examples, the relative contribution of the first pixel data 152 and the second pixel data 154 to the focus data may depend on both the luminance of light captured by one of the at least two of the second plurality of sensor sub-pixels and the amount of motion in the image. The calculation of the relative contribution of the first pixel data 152 and the second pixel data 154 to the focus data in such examples may be summarized as:

$$F_O = (1-\alpha) F_1 + \alpha F_2$$

where $F_O$ is the focus data, $F_1$ is the first pixel data 152, $F_2$ is the second pixel data 154 (with the first exposure shorter than the second exposure) and where $\alpha$ is equal to 0 if: the intensity of a sensor sub-pixel of the at least two of the second plurality of sensor sub-pixels is greater than a threshold intensity, such as 90% of the maximum amount of light capturable by a sensor sub-pixel of the second plurality with the second exposure; or if the amount of motion in the scene or in a portion of the scene captured by the image capture device equals or exceeds a threshold amount. Otherwise, $\alpha$ is equal to 1.

In further examples, the relative contribution of the first pixel data 152 and the second pixel data 154 to the focus data may be calculated differently. For example, $\alpha$ may be a function, such as a smoothly varying function, based on the first pixel data 152 and/or the second pixel data 154.

Referring back to the structure of the image sensor 1002, the first and second pluralities of the sensor sub-pixels 1004, 1006 may be similar to the first and second pluralities of the sensor sub-pixels 104, 106 described with reference to FIG. 1. Thus, the image sensor 1002 may be similar to the image sensor 102 of FIG. 1 or the image sensors 202, 302, 402, 502, 602 of FIGS. 2 to 6. For example, as described with reference to FIGS. 2 and 3, a first sensor pixel may include one of the at least two of the first plurality of the sensor sub-pixels 1004, a second sensor pixel may include one of the at least two of the first plurality of the sensor sub-pixels 1004, a third sensor pixel may include one of the at least two of the second plurality of the sensor sub-pixels 1006 and a fourth sensor pixel may include one of the at least two of the second plurality of the sensor sub-pixels 1006.

In examples, as described with reference to FIGS. 2 and 3, the at least two of the first plurality of the sensor sub-pixels 1004 may include a first sensor sub-pixel in a first array row and a first array column and a sensor sub-pixel in a second array row and a second array column, with the first array row adjacent to the second array row and the first array column adjacent to the second array column. In these examples, the at least two of the second plurality of the sensor sub-pixels 1006 may include a third sensor sub-pixel in the second array row and a third array column and a fourth sensor sub-pixel in the first array row and a fourth array column, the third array column adjacent to the second array column and the fourth array column adjacent to the third array column.

In other examples, the image sensor 1002 may be similar to the image sensor 802 of FIG. 8, with the first plurality of the sensor sub-pixels 1004 corresponding to the sensor sub-pixels of sensor pixels of the second type 136 and the second plurality of the sensor sub-pixels 1006 corresponding to the sensor sub-pixels of sensor pixels of the third type 144. In such cases, a first sensor pixel may include at least two of the first plurality of the sensor sub-pixels 1004 and/or a second sensor pixel may include at least two of the second plurality of the sensor sub-pixels 1006.

Regardless of whether the image sensor 1002 of FIG. 10 is similar to that of FIGS. 2 to 6 or to that of FIG. 8, the at least two of the first plurality of the sensor sub-pixels 1004 may be adjacent to each other. Furthermore, at least two of the second plurality of the sensor sub-pixels 1006 may be adjacent to each other.

The image sensor 1002 may include a colour filter array including a pattern of colour filter elements, colour filter elements corresponding to respective sensor pixels of the plurality of sensor pixels. The at least two of the first plurality of the sensor sub-pixels 1004 may correspond to sensor sub-pixels of the same colour as each other, which may be a green colour filter element for example. Similarly, the at least two of the second plurality of the sensor sub-pixels 1006 may correspond to sensor sub-pixels of the same colour as each other, which also may be a green colour filter element.

The image sensor 1000 of FIG. 10 may also include an image processor, such as the image processor 112 of FIG. 1, although the image processor may be absent in some cases, or formed as a separate component from the image sensor 1000.

Figure 11:
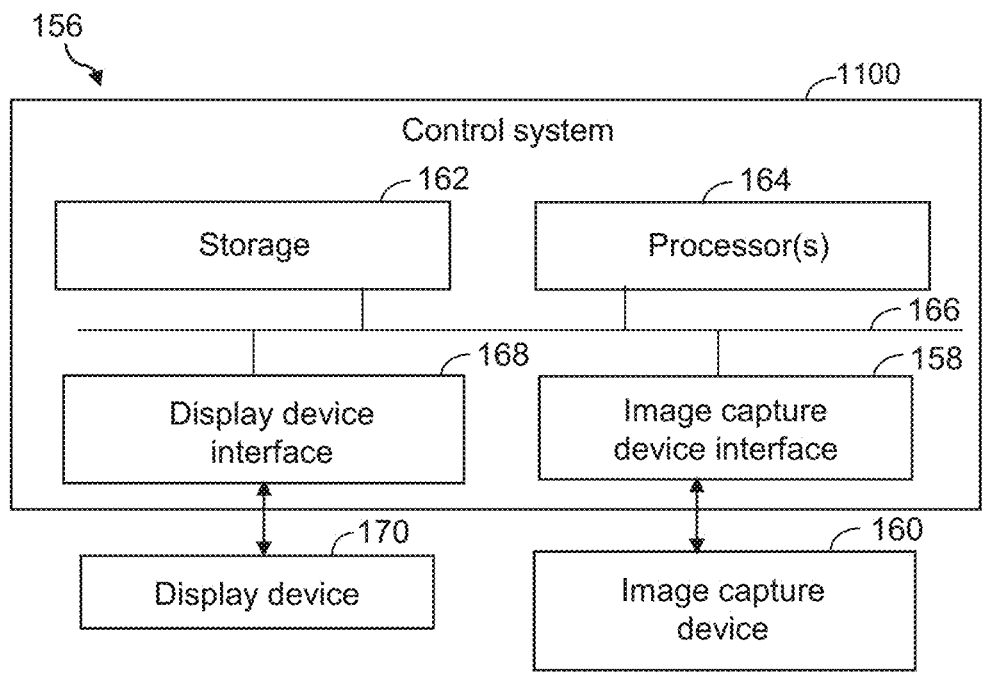
FIG. 11 is a block diagram illustrating schematically internal components of a control system according to examples.

FIG. 11 is a block diagram illustrating schematically internal components of a control system according to examples, such as the control systems 100, 700, 900, 1000 described with reference to FIGS. 1, 7, 9 and 10 respectively. FIG. 11 shows a system which includes a control system 1100. The control system 1100 includes an image capture device interface 158 to retrieve data from an image capture device 160. Although the control system 1100 of FIG. 11 is shown as separate from but coupled to an image capture device 160, in other examples the control system 1100 and the image capture device 160 may integrated in one device.

The image capture device 160 typically includes an image sensor including an array of sensor pixels, such as the image sensors described above. The data from the image capture device 1100 may therefore include the image data, the focus data and/or pixel data from sensor pixels or sensor sub-pixels. The image capture device interface 158 may include software and/or hardware components.

Storage 162 of the control system 1100 in the example of FIG. 11 stores the data received at the image capture device interface 158. The storage 162 may include at least one of volatile memory, such as a Random Access Memory (RAM) and non-volatile memory, such as Read Only Memory (ROM) or a solid state drive (SSD) such as Flash memory. The storage 162 in examples may include further storage devices, for example magnetic, optical or tape media, compact disc (CD), digital versatile disc (DVD) or other data storage media. The storage 162 may be removable or non-removable from the control system 1100 or the image capture device 160 (where the control system 1100 is integrated in the image capture device 160).

At least one processor 164 is communicatively coupled to the storage 162. The at least one processor 164 in the example of FIG. 11 may include a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The storage 162 in the example of FIG. 11 may include computer program instructions configured to, when processed by the at least one processor 164, implement an image processor and/or a focus controller, such as those described in the examples above. The computer program instructions may be stored in an accessible non-transitory computer-readable medium and loaded into memory, for example the storage 162, to implement the image processor and/or the focus controller.

The components of the system 156 in the example of FIG. 11 are interconnected using a systems bus 166. This allows data to be transferred between the various components. For example, the output data generated by the image processor according to examples can be stored in the storage 162 and subsequently transmitted via the systems bus 166 from the storage 162 to a display device interface 168 for transfer to a display device 170 for display. The display device interface 168 may include a display port and/or an internal electronics interface, e.g. where the control system 1100 and the display device 170 are part of the image capture device 160 such as a display screen of a smartphone or a digital camera. Therefore, when instructed by the at least one processor 164 via the display device interface 168, the display device 170 may display the at least part of the output image based on the output data.

The above examples are to be understood as illustrative examples. Further examples are envisaged. In the example described above with reference to FIG. 1, a relative contribution of the first sub-image data and the second sub-image data to the output data may depend on a luminance of light captured by at least one of: the sub-pixels of the first plurality 104 of the sensor sub-pixels or the sub-pixels of the second plurality 106 of the sensor sub-pixels. In other, similar, examples, the relative contribution of the first sub-image data and the second sub-image data to the output data may additionally or alternatively depend on the amount of motion in all or part of the image or scene to be captured by the image capture device. In this case, the relative contribution of the first sub-image data and the second sub-image data to the output data may be calculated similarly to the calculation of the relative contribution of the first pixel data and the second pixel data to the focus data described with reference to FIG. 10.

It is to be understood that any feature described in relation to any one example may be used alone, or in combination with other features described, and may also be used in combination with one or more features of any other of the examples, or any combination of any other of the examples.

Furthermore, equivalents and modifications not described above may also be employed without departing from the scope of the accompanying claims.

Further examples are described in accordance with the following numbered clauses:

1. A control system for an image capture device, the control system comprising:
    an image sensor comprising:
        an array of sensor pixels, sensor pixels of the array of sensor pixels comprising at least two sub-pixels respectively; and
        a colour filter array comprising a pattern of colour filter elements, colour filter elements corresponding to respective sensor pixels of the array of sensor pixels, wherein:
        a first plurality of the sensor sub-pixels are configured to capture first pixel data with a first exposure; and
        a second plurality of the sensor sub-pixels are configured to capture second pixel data with a second exposure different from the first exposure;
    an image processor configured to:
    receive image data derived from a first set of the sensor sub-pixels, the first set comprising:
        sub-pixels of the first plurality of the sensor sub-pixels; and
        sub-pixels of the second plurality of the sensor sub-pixels; and
        on the basis of the image data, generate output data representing at least part of an output image; and
    a focus controller configured to:
    receive focus data derived from a second set of the sensor sub-pixels, the second set comprising at least two of the first plurality of the sensor sub-pixels; and
    on the basis of the focus data, generate a control signal for adjusting a focus of the image capture device.

2. The control system according to clause 1, wherein the focus controller is a phase-detection autofocus controller for adjusting the focus of the image capture device based on a phase detection autofocus process.

3. The control system according to clause 1 or clause 2, wherein the focus controller is further configured to:
    receive further focus data from a third set of the sensor sub-pixels with a third exposure different from the first exposure; and
    generate the control signal on the basis of at least one of the focus data or the further focus data.

4. The control system according to clause 3, wherein the third set comprises at least two of the second plurality of the sensor sub-pixels, and wherein the third exposure is equal to the second exposure.

5. The control system according to clause 3 or clause 4, wherein the focus controller is configured to generate the control signal based on focus characteristic data indicative of a focus characteristic,
    a relative contribution of the focus data and the further focus data to the focus characteristic data depending on a luminance of light captured by at least one of:
    the second set of the sensor sub-pixels; or
    the third set of the sensor sub-pixels.

6. The control system according to clause 5, wherein the first exposure is shorter than the third exposure, and
    with the luminance of light captured by the second set of the sensor sub-pixels equal to or above a luminance threshold, the focus characteristic data is generated based on the focus data; and
    with the luminance of light captured by the second set of the sensor sub-pixels below the luminance threshold, the focus characteristic data is generated based on the further focus data.

7. The control system according to any one of clauses 1 to 6, wherein the output image is a high dynamic range image.

8. The control system according to any one of clauses 1 to 7, wherein the image data comprises:
    first sub-image data representing data received from the sub-pixels of the first plurality of the sensor sub-pixels; and
    second sub-image data representing data received from the sub-pixels of the second plurality of the sensor sub-pixels,
    a relative contribution of the first sub-image data and the second sub-image data to the output data depending on a luminance of light captured by at least one of:
    the sub-pixels of the first plurality of the sensor sub-pixels; or
    the sub-pixels of the second plurality of the sensor sub-pixels.

9. The control system according to clause 8, wherein the first exposure is shorter than the second exposure, and
    with the luminance of light captured by the sub-pixels of the second plurality of the sensor sub-pixels equal to or above a luminance threshold, the output data is generated based on the first sub-image data; and
    with the luminance of light captured by the sub-pixels of the second plurality of the sensor sub-pixels below the luminance threshold, the output data is generated based on the second sub-image data.

10. The control system according to any one of clauses 1 to 9, wherein the focus controller is configured to receive the focus data substantially simultaneously as the image processor is configured to receive the image data.

11. The control system according to any one of clauses 1 to 10, wherein the image data comprises the focus data.

12. The control system according to any one of clauses 1 to 11, wherein the second set of the sensor sub-pixels comprises:
    a first sensor sub-pixel adjacent to a second sensor sub-pixel.

13. The control system according to any one of clauses 1 to 12, wherein the second set of the sensor sub-pixels comprises:
    a first sensor sub-pixel in a first array row and a first array column; and
    a second sensor sub-pixel in a second array row and a second array column,
    the first array row adjacent to the second array row, and
    the first array column adjacent to the second array column.

14. The control system according to any one of clauses 1 to 13, wherein the first plurality of the sensor sub-pixels are in at least one first array column and the second plurality of the sensor sub-pixels are in at least one second array column, different from the at least one first array column.

15. The control system according to any one of clauses 1 to 14, wherein the first plurality of the sensor sub-pixels are in two adjacent first array columns and the second plurality of the sensor sub-pixels are in two adjacent second array columns,
    one of the two adjacent first array columns adjacent to one of the two adjacent second array columns.

16. The control system according to any one of clauses 1 to 12, wherein the array of sensor pixels comprises:

a first array column in which:
a sensor sub-pixel of the first plurality of the sensor sub-pixels alternates with a sensor
sub-pixel of the second plurality of the sensor sub-pixels;
a second array column in which:
a sensor sub-pixel of the first plurality of the sensor sub-pixels alternates with a sensor sub-pixel of the second plurality of the sensor sub-pixels, the second array column adjacent to the first array column and with the sensor sub-pixels of the first plurality of the sensor pixels of the first array column adjacent to the sensor sub-pixels of the second plurality of the sensor pixels of the second array column and with the sensor sub-pixels of the second plurality of the sensor pixels of the first array column adjacent to the sensor sub-pixels of the first plurality of the sensor pixels of the second array column;
a third array column adjacent to the second array column comprising:
sensor sub-pixels of the first plurality of the sensor sub-pixels; and
a fourth array column adjacent to the third array column comprising:
sensor sub-pixels of the second plurality of the sensor sub-pixels.

17. The control system according to any one of clauses 1 to 16, wherein the first set of the sensor sub-pixels comprise the at least two of the first plurality of the sensor sub-pixels of the second set of the sensor sub-pixels.

18. The control system according to any one of clauses 1 to 17, wherein the at least two of the first plurality of the sensor sub-pixels comprise two sensor sub-pixels of the same sensor pixel.

19. The control system according to any one of clauses 1 to 18, wherein the pattern of colour filter elements comprises at least one group of colour filter elements, the at least one group of colour filter elements comprising a red colour filter element, a blue colour filter element and two green colour filter elements.

20. The control system according to any one of clauses 1 to 19, wherein each sensor sub-pixel of the second set of the sensor sub-pixels corresponds respectively to a colour filter element of the same colour as each other.

21. The control system according to clause 20, wherein each sensor sub-pixel of the second set of the sensor sub-pixels corresponds respectively to a green colour filter element.

22. An image sensor comprising:
an array of sensor pixels, sensor pixels of the array of sensor pixels comprising at least two sensor sub-pixels, wherein:
a first type of sensor pixel of the array of sensor pixels comprises:
a first sensor sub-pixel configured to capture first pixel data with a first exposure; and
a second sensor sub-pixel configured to capture second pixel data with a second exposure different from the first exposure; and
a second type of sensor pixel of the array of sensor pixels, different from the first type of sensor pixel, comprises:
a third sensor sub-pixel configured to capture third pixel data with a third exposure; and
a fourth sensor sub-pixel configured to capture fourth pixel data with the third exposure.

23. The image sensor according to clause 22, wherein the third exposure is equal to the first exposure.

24. The image sensors according to clause 22, wherein the third exposure is longer than the first exposure and shorter than the second exposure.

25. The image sensor according to any one of clauses 22 to 24, wherein the first exposure is shorter than the second exposure.

26. The image sensor according to any one of clauses 22 to 25, comprising a colour filter array comprising a pattern of colour filter elements, colour filter elements corresponding to respective sensor pixels of the array of sensor pixels.

27. The image sensor according to clause 26, wherein a green colour filter element corresponds to a sensor pixel of the second type.

28. The image sensor according to clause 26 or clause 27, wherein the pattern of colour filter elements comprises at least one group of colour filter elements, the at least one group of colour filter elements comprising a red colour filter element, a blue colour filter element and two green colour filter elements.

29. The image sensor according to any one of clauses 22 to 28, wherein a third type of sensor pixel of the array of sensor pixels comprises:
a fifth sensor sub-pixel configured to capture fifth pixel data with a fourth exposure; and
a sixth sensor sub-pixel configured to capture sixth pixel data with the fourth exposure,
wherein the fourth exposure is different from the third exposure.

30. The image sensor according to clause 29, wherein the fourth exposure is equal to the second exposure.

31. The image sensor according to clause 29, when dependent on any of clauses 26 to 28, or clause 30, when dependent on any of clauses 26 to 28, wherein a green colour filter element corresponds to a sensor pixel of the third type.

32. The image sensor according to any one of clauses 22 to 31, wherein at least 85%, 90% or 95% of the array of sensor pixels are of the first type.

33. The image sensor according to any one of clauses 22 to 32, wherein sensor pixels of the second type are substantially uniformly distributed in the array of sensor pixels.

34. A control system for an image capture device, the control system comprising:
a focus controller; and
the image sensor according to any one of clauses 22 to 33.

35. The control system according to clause 34, wherein the focus controller is configured to:
receive focus data derived from sensor pixels of the second type; and
on the basis of the focus data, generate a control signal for adjusting a focus of the image capture device.

36. The control system according to clause 35, wherein the focus controller is a phase-detection autofocus controller for adjusting the focus of the image capture device based on a phase detection autofocus process.

37. The control system according to clause 35, when dependent on any of clauses 29 to 31, or clause 36, when dependent on any of clauses 29 to 31, wherein the focus controller is configured to:
receive further focus data derived from sensor pixels of the third type; and
generate the control signal on the basis of at least one of the focus data or the further focus data.

38. The control system according to clause 37, wherein the focus controller is configured to generate the control signal based on focus characteristic data indicative of a focus characteristic, a relative contribution of the focus data and the further focus data to the focus characteristic data depending on a luminance of light captured by at least one of:
the sensor pixels of the second type; or
the sensor pixels of the third type.

39. The control system according to clause 38, wherein the third exposure is shorter than the fourth exposure, and
with the luminance of light captured by the sensor pixels of the third type equal to or above a luminance threshold, the focus characteristic data is generated based on the focus data; and
with the luminance of light captured by the sensor pixels of the third type below the luminance threshold, the focus characteristic data is generated based on the further focus data.

40. A control system for an image capture device, the control system comprising:
an image sensor comprising:
an array of sensor pixels, sensor pixels of the array of sensor pixels comprising at least two sensor sub-pixels respectively, wherein:
a first plurality of the sensor sub-pixels are configured to capture first pixel data with a first exposure; and
a second plurality of the sensor sub-pixels are configured to capture second pixel data with a second exposure different from the first exposure; and
a focus controller configured to:
receive focus data based on:
the first pixel data of at least two of the first plurality of the sensor sub-pixels; and
the second pixel data of at least two of the second plurality of the sensor sub-pixels; and
on the basis of the focus data, generate a control signal for adjusting a focus of the image capture device.

41. The control system according to clause 40, wherein a relative contribution of the first pixel data and the second pixel data to the focus data depends on a luminance of light captured by:
at least one of the at least two of the first plurality of the sensor sub-pixels; or
at least one of the at least two of the second plurality of the sensor sub-pixels.

42. The control system according to clause 41, wherein the first exposure is shorter than the second exposure,
a first relative contribution of the first pixel data to the focus data for a first luminance of light captured by the at least one of the at least two of the first plurality of the sensor sub-pixels being smaller than
a second relative contribution of the first pixel data to the focus data for a second luminance of light captured by the at least one of the at least two of the first plurality of the sensor sub-pixels, the second luminance larger than the first luminance.

43. The control system according to any one of clauses 40 to 42, wherein the focus controller is configured to derive the focus data based on the first pixel data and the second pixel data,
the deriving the focus data comprising:
selecting one of the first pixel data and the second pixel data to obtain selected pixel data; and
generating the focus data based on the selected pixel data.

44. The control system according to clause 43, wherein the selecting the one of the first pixel data and the second pixel data comprises selecting one of the first pixel data and the second pixel data in dependence on a luminance of light captured by:
at least one of the at least two of the first plurality of the sensor sub-pixels; or
at least one of the at least two of the second plurality of the sensor sub-pixels.

45. The control system according to clause 44, wherein the selecting the one of the first pixel data and the second pixel data comprises:
selecting the first pixel data for the luminance of light captured by the at least one of the at least two of the second plurality of the sensor sub-pixels equal to or above a luminance threshold; and
selecting the second pixel data for the luminance of light captured by the at least one of the at least two of the second plurality of the sensor sub-pixels below the luminance threshold.

46. The control system according to clause 45, wherein the luminance threshold corresponds to approximately 90% or 90% of a maximum luminance capturable by one of the second plurality of the sensor sub-pixels.

47. The control system according to any one of clauses 40 to 46, wherein a first sensor pixel comprises at least two of the first plurality of the sensor sub-pixels.

48. The control system according to any one of clauses 40 to 47, wherein a second sensor pixel comprises at least two of the second plurality of the sensor sub-pixels.

49. The control system according to any one of clauses 40 to 46, wherein
a first sensor pixel comprises one of the at least two of the first plurality of the sensor sub-pixels;
a second sensor pixel comprises one of the at least two of the first plurality of the sensor sub-pixels;
a third sensor pixel comprises one of the at least two of the second plurality of the sensor sub-pixels; and
a fourth sensor pixel comprises one of the at least two of the second plurality of the sensor sub-pixels.

50. The control system according to any one of clauses 40 to 49, wherein at least two of the first plurality of the sensor sub-pixels are adjacent to each other.

51. The control system according to any one of clauses 40 to 50, wherein at least two of the second plurality of the sensor sub-pixels are adjacent to each other.

52. The control system according to any one of clauses 40 to 51, wherein the at least two of the first plurality of the sensor sub-pixels comprise:
a first sensor sub-pixel in a first array row and a first array column; and
a second sensor sub-pixel in a second array row and a second array column,
the first array row adjacent to the second array row, and the first array column adjacent to the second array column.

53. The control system according to clause 52, wherein the at least two of the second plurality of the sensor sub-pixels comprise:
a third sensor sub-pixel in the second array row and a third array column; and
a fourth sensor sub-pixel in the first array row and a fourth array column, the third array column adjacent to the second array column,
the fourth array column adjacent to the third array column.

54. The control system according to any one of clauses 40 to 53, wherein the image sensor comprises a colour filter array comprising a pattern of colour filter elements, colour filter elements corresponding to respective sensor pixels of the array of sensor pixels.

55. The control system according to clause 54, wherein the at least two of the first plurality of the sensor sub-pixels correspond respectively to a green colour filter element.

56. The control system according to clause 54 or clause 55, wherein the at least two of the second plurality of the sensor sub-pixels correspond respectively to a green colour filter element.

What is claimed is:

1. A control system for an image capture device, the control system comprising:
   an image sensor comprising:
      an array of sensor pixels, sensor pixels of the array of sensor pixels comprising at least two sensor sub-pixels respectively; and
      a colour filter array comprising a pattern of colour filter elements, colour filter elements corresponding to respective sensor pixels of the array of sensor pixels, wherein:
         a first plurality of the sensor sub-pixels are configured to capture first pixel data with a first exposure; and
         a second plurality of the sensor sub-pixels are configured to capture second pixel data with a second exposure different from the first exposure;
   an image processor configured to:
      receive image data derived from a first set of the sensor sub-pixels, the first set comprising:
         sensor sub-pixels of the first plurality of the sensor sub-pixels; and
         sensor sub-pixels of the second plurality of the sensor sub-pixels; and
      on the basis of the image data, generate output data representing at least part of an output image; and
   a focus controller configured to:
      receive focus data based on at least one of: at least a portion of the first pixel data from at least two of the first plurality of the sensor sub-pixels, or at least a portion of the second pixel data from at least two of the second plurality of the sensor sub-pixels, wherein a relative contribution of the portion of the first pixel data and the portion of the second pixel data to the focus data depends on motion in a scene to be captured by the image capture device; and
      on the basis of the focus data, generate a control signal for adjusting a focus of the image capture device.

2. The control system according to claim 1, wherein the focus controller is a phase-detection autofocus controller for adjusting the focus of the image capture device based on a phase detection autofocus process.

3. The control system according to claim 1, wherein the relative contribution of the portion of the first pixel data and the portion of the second pixel data to the focus data further depends on a luminance of light captured by at least one of:
   at least one of the at least two of the first plurality of the sensor sub-pixels; or
   at least one of the at least two of the second plurality of the sensor sub-pixels.

4. The control system according to claim 3, wherein:
   with the luminance of light captured by the at least one of the at least two of the first plurality of the sensor sub-pixels equal to or above a luminance threshold, the focus data is generated based on the portion of the first pixel data; and
   with the luminance of light captured by the at least one of the at least two of the first plurality of sensor sub-pixels below the luminance threshold, the focus data is generated based on the portion of the second pixel data.

5. The control system according to claim 1, wherein the image data comprises:
   first sub-image data representing data received from the sensor sub-pixels of the first plurality of the sensor sub-pixels; and
   second sub-image data representing data received from the sensor sub-pixels of the second plurality of the sensor sub-pixels,
   a relative contribution of the first sub-image data and the second sub-image data to the output data depending on a luminance of light captured by at least one of:
      the sensor sub-pixels of the first plurality of the sensor sub-pixels; or
      the sensor sub-pixels of the second plurality of the sensor sub-pixels.

6. The control system according to claim 5, wherein:
   the first exposure is shorter than the second exposure;
   with the luminance of light captured by the sensor sub-pixels of the second plurality of the sensor sub-pixels equal to or above a luminance threshold, the output data is generated based on the first sub-image data; and
   with the luminance of light captured by the sensor sub-pixels of the second plurality of the sensor sub-pixels below the luminance threshold, the output data is generated based on the second sub-image data.

7. The control system according to claim 1, wherein the image data comprises the focus data.

8. The control system according to claim 1, wherein the at least two of the first plurality of the sensor sub-pixels comprises:
   a first sensor sub-pixel adjacent to a second sensor sub-pixel.

9. The control system according to claim 1, wherein the at least two of the first plurality of the sensor sub-pixels comprises:
   a first sensor sub-pixel in a first array row and a third array column; and
   a second sensor sub-pixel in a second array row and a fourth array column,
   the first array row adjacent to the second array row, and the third array column adjacent to the fourth array column.

10. The control system according to claim 1, wherein the first plurality of the sensor sub-pixels are in two adjacent first array columns, comprising the first array column, and the second plurality of the sensor sub-pixels are in two adjacent second array columns, comprising the second array column.

11. The control system according to claim 1, wherein the array of sensor pixels comprises:
   a third array column in which:
      a sensor sub-pixel of the first plurality of the sensor sub-pixels alternates with a sensor sub-pixel of the second plurality of the sensor sub-pixels; and
   a fourth array column in which:
      a sensor sub-pixel of the first plurality of the sensor sub-pixels alternates with a sensor sub-pixel of the second plurality of the sensor sub-pixels, the fourth array column adjacent to the third array column and with the sensor sub-pixels of the first plurality of the sensor pixels of the third array column adjacent to the sensor sub-pixels of the second plurality of the sensor pixels of the fourth array column and with the sensor sub-pixels of the second plurality of the sensor pixels of the third array column adjacent to the sensor sub-pixels of the first plurality of the sensor pixels of the fourth array column.

12. The control system according to claim 1, wherein the first set of the sensor sub-pixels comprises the at least two of the first plurality of the sensor sub-pixels.

13. The control system according to claim 1, wherein the at least two of the first plurality of the sensor sub-pixels comprise two sensor sub-pixels of the same sensor pixel.

14. The control system according to claim 1, wherein each sensor sub-pixel of the at least two of the first plurality of the sensor sub-pixels corresponds respectively to a colour filter element of the same colour as each other.

15. The control system according to claim 14, wherein each sensor sub-pixel of the at least two of the first plurality of the sensor sub-pixels corresponds respectively to a green colour filter element.

16. The control system according to claim 1, wherein the pattern of colour filter elements comprises at least one group of colour filter elements, the at least one group of colour filter elements comprising a red colour filter element, a blue colour filter element and two green colour filter elements.

17. The control system according to claim 1, wherein the focus controller is configured to receive the focus data substantially simultaneously as the image processor is configured to receive the image data.

18. The control system of claim 1, wherein:
a first sensor sub-pixel of the sensor sub-pixels of the first plurality of the sensor sub-pixels corresponding to a colour filter element of a particular colour is arranged in a particular row of the array of sensor pixels and a first array column of the array of sensor pixels; and
a second sensor sub-pixel of the sensor sub-pixels of the second plurality of the sensor sub-pixels corresponding to a colour filter element of the particular colour is arranged in the particular row of the array of sensor pixels and a second array column of the array of sensor pixels, adjacent to the first array column.

19. The control system according to claim 18, wherein a sensor pixel of the array of sensor pixels comprises the first sensor sub-pixel and the second sensor sub-pixel.

20. The control system according to claim 1, wherein:
with the motion equal to or above a motion threshold, the focus data is generated based on at least the portion of the first pixel data; and
with the motion below the motion threshold, the focus data is generated based on at least the portion of the second pixel data.

* * * * *